US010296302B1

(12) United States Patent
Ma et al.

(10) Patent No.: US 10,296,302 B1
(45) Date of Patent: May 21, 2019

(54) ONE-CLICK DEPLOYMENT OF INDUSTRIAL SOFTWARE

(71) Applicant: General Electric Company, Schenectady, NY (US)

(72) Inventors: Huiyuan Ma, Burnaby (CA); Wei Chung Hsieh, Burnaby (CA); Sze Yip Chan, Burnaby (CA); Simo Pylvas, Burnaby (CA); Jason Jaguar Rivero, Burnaby (CA); Philip Chan, Buranaby (CA); Raymond Lum, Buranaby (CA); Michael Varney, Gig Harbor, WA (US)

(73) Assignee: General Electric Company, Schenectady, NY (US)

( * ) Notice: Subject to any disclaimer, the term of this patent is extended or adjusted under 35 U.S.C. 154(b) by 1 day.

(21) Appl. No.: 15/804,223

(22) Filed: Nov. 6, 2017

(51) Int. Cl.
*G06F 9/44* (2018.01)
*G06F 9/45* (2006.01)
*G06F 9/445* (2018.01)
*G06F 8/34* (2018.01)
*G06F 8/71* (2018.01)
*G06F 8/36* (2018.01)
*G06F 8/60* (2018.01)
(Continued)

(52) U.S. Cl.
CPC .................. *G06F 8/34* (2013.01); *G06F 8/36* (2013.01); *G06F 8/60* (2013.01); *G06F 8/61* (2013.01); *G06F 8/71* (2013.01); *G06F 11/3688* (2013.01)

(58) Field of Classification Search
CPC ..... G06F 8/34; G06F 8/60; G06F 8/61; G06F 11/3688
See application file for complete search history.

(56) References Cited

U.S. PATENT DOCUMENTS

| 7,134,122 B1 * | 11/2006 | Sero | G06F 8/61 |
| | | | 717/177 |
| 8,677,315 B1 * | 3/2014 | Anderson | G06F 8/60 |
| | | | 717/101 |

(Continued)

OTHER PUBLICATIONS

Mohammad Al Saad, ScatterClipse: A Model-Driven Tool-Chain for Developing, Testing, and Prototyping Wireless Sensor Networks, 2008, pp. 871-885. https://ieeexplore.ieee.org/stamp/stamp.jsp?tp=&arnumber=4725241 (Year: 2008).*

(Continued)

*Primary Examiner* — Mongbao Nguyen
(74) *Attorney, Agent, or Firm* — Buckley, Maschoff & Talwalkar LLC

(57) ABSTRACT

The example embodiments are directed to a system and method for generating and controlling a user interface for managing a software development lifecycle of an industrial software application. In one example, the method includes developing a software application via a user interface, storing an application file representing the developed software application in a code repository associated with the user interface, testing the application file to determine whether the developed software application successfully satisfies requirements for a platform, and deploying the successfully tested application file from the code repository to the platform and activating the application on the platform, in response to receiving a user request.

11 Claims, 8 Drawing Sheets

(51) Int. Cl.
*G06F 8/61* (2018.01)
*G06F 11/36* (2006.01)

(56) References Cited

U.S. PATENT DOCUMENTS

| | | | | |
|---|---|---|---|---|
| 2011/0161912 A1* | 6/2011 | Eteminan | G06F 8/20 | 717/101 |
| 2013/0152078 A1* | 6/2013 | Arcilla | G06F 8/60 | 718/1 |
| 2013/0205293 A1* | 8/2013 | Levijarvi | G06F 8/61 | 717/177 |
| 2014/0149966 A1* | 5/2014 | Binjrajka | G06F 8/72 | 717/121 |
| 2014/0282400 A1* | 9/2014 | Moorthi | G06F 8/71 | 717/122 |
| 2015/0052513 A1* | 2/2015 | Robinson | H04L 67/42 | 717/176 |
| 2015/0089299 A1* | 3/2015 | Gittelman | G06F 11/3688 | 714/38.14 |
| 2015/0178050 A1* | 6/2015 | Said | G06F 8/30 | 717/106 |
| 2015/0199197 A1* | 7/2015 | Maes | G06F 8/71 | 717/122 |
| 2015/0205602 A1* | 7/2015 | Prismon | G06F 8/71 | 717/121 |
| 2016/0034267 A1* | 2/2016 | Wetzold | G06F 8/71 | 717/172 |
| 2016/0112497 A1* | 4/2016 | Koushik | H04L 67/10 | 726/7 |
| 2017/0060562 A1* | 3/2017 | Lopez | G06F 8/60 | |
| 2017/0177324 A1* | 6/2017 | Frank | G06F 8/65 | |
| 2017/0206076 A1* | 7/2017 | Naqvi | G06F 8/65 | |
| 2017/0220451 A1* | 8/2017 | Mankovskii | G06F 11/3664 | |
| 2018/0060210 A1* | 3/2018 | Pandey | G06F 11/3688 | |
| 2018/0307472 A1* | 10/2018 | Paul | G06F 8/60 | |

OTHER PUBLICATIONS

Tomislav Zitnik, Test Environment & Application as a Service, 2016, pp. 571-574. https://ieeexplore.ieee.org/stamp/stamp.jsp?tp=&arnumber=7522207 (Year: 2016).*

Ozan Gunalp, Demo Abstract: Reproducible Deployment of Pervasive Applications, 2015, pp. 211-213. https://ieeexplore.ieee.org/stamp/stamp.jsp?tp=&arnumber=7134025 (Year: 2015).*

Eran Sher, Application Release Automation with Zero Touch Deployment, 2014, pp. 1-8. https://ieeexplore.ieee.org/stamp/stamp.jsp?tp=arnumber=7522207 (Year: 2014).*

* cited by examiner

ONE-CLICK DEPLOYMENT OF INDUSTRIAL SOFTWARE

BACKGROUND

Machine and equipment assets, generally, are engineered to perform particular tasks as part of a business process. For example, assets can include, among other things and without limitation, industrial manufacturing equipment on a production line, drilling equipment for use in mining operations, wind turbines that generate electricity on a wind farm, transportation vehicles, and the like. As another example, assets may include healthcare machines and equipment that aid in diagnosing patients such as imaging devices (e.g., X-ray or MRI systems), monitoring devices, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

Machine and equipment assets are often controlled by industrial software which may be included within an Industrial Internet of Things (IIoT). Industrial software is often implemented within machines, on-premises, in a cloud environment, and the like, and can be used to manage devices, analyze data, predict future characteristics of or about assets, schedule maintenance, and the like. Industrial software is typically used by technicians in the field, administrative staff on a back-end, customers, and the like, who are not very familiar with designing software applications or generating executable code. However, these users are very familiar with the data provided from assets and functions that they need in order to perform their duties. Accordingly, what is needed is a tool that can facilitate industrial software development and deployment without the requirement of a programmer or other expert in generating code.

SUMMARY

Embodiments described herein improve upon the prior art by providing systems and methods which facilitate and manage the software development lifecycle of an industrial-based software application. A software development lifecycle service can provide developers with a user interface for developing and deploying applications without requiring users to write significant portions of code or perform lengthy installation and activation processes to active the software. Accordingly, even a citizen developer can generate new and update previously designed software applications. In some examples, the example embodiments herein may be incorporated within software such as a service or other program that is deployed on a cloud platform for use with an Industrial Internet of Things (IIoT) system. The embodiments disclosed herein automate and guide a user through the software development process in order to improve on the previous manual approaches performed in the prior art.

In an aspect of an example embodiment, a computer-implemented method includes displaying a user interface for managing a software development lifecycle of an application, determining software components available for developing the application and displaying representations of the software components via the user interface, receiving a selection of at least one software component from among the available software components, via the user interface, and adding the selected at least one software component to a development workspace of the user interface, configuring the selected at least one software component based on data that is to be processed by the application, and generating an application file for the application including the at least one configured software component and storing the application file in a code repository.

In an aspect of another example embodiment, a computing system includes an output configured to output a user interface for managing a software development lifecycle of an application, and a processor configured to determine software components available for developing the application and displaying representations of the software components via the user interface, detect a selection of at least one software component from among the available software components via the user interface, add the selected at least one software component to a development workspace of the user interface, configure the selected at least one software component based on data that is to be processed by the application, and generate an application file for the application including the at least one configured software component and store the application file in a code repository.

In an aspect of another example embodiment, a computer-implemented method includes developing a software application via a user interface, storing an application file representing the developed software application in a code repository associated with the user interface, testing the application file to determine whether the developed software application successfully satisfies requirements for a platform, and deploying the successfully tested application file from the code repository to the platform for active use, in response to receiving a user request.

In an aspect of yet another example embodiment, a computing system includes a processor configured to detect commands for developing a software application via a user interface, store an application file representing the developed software application in a code repository associated with the user interface, and test the application file to determine whether the developed software application successfully satisfies requirements for a platform, wherein the processor is further configured to deploy the successfully tested application file from the code repository to the platform for active use, in response to detecting a user request.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
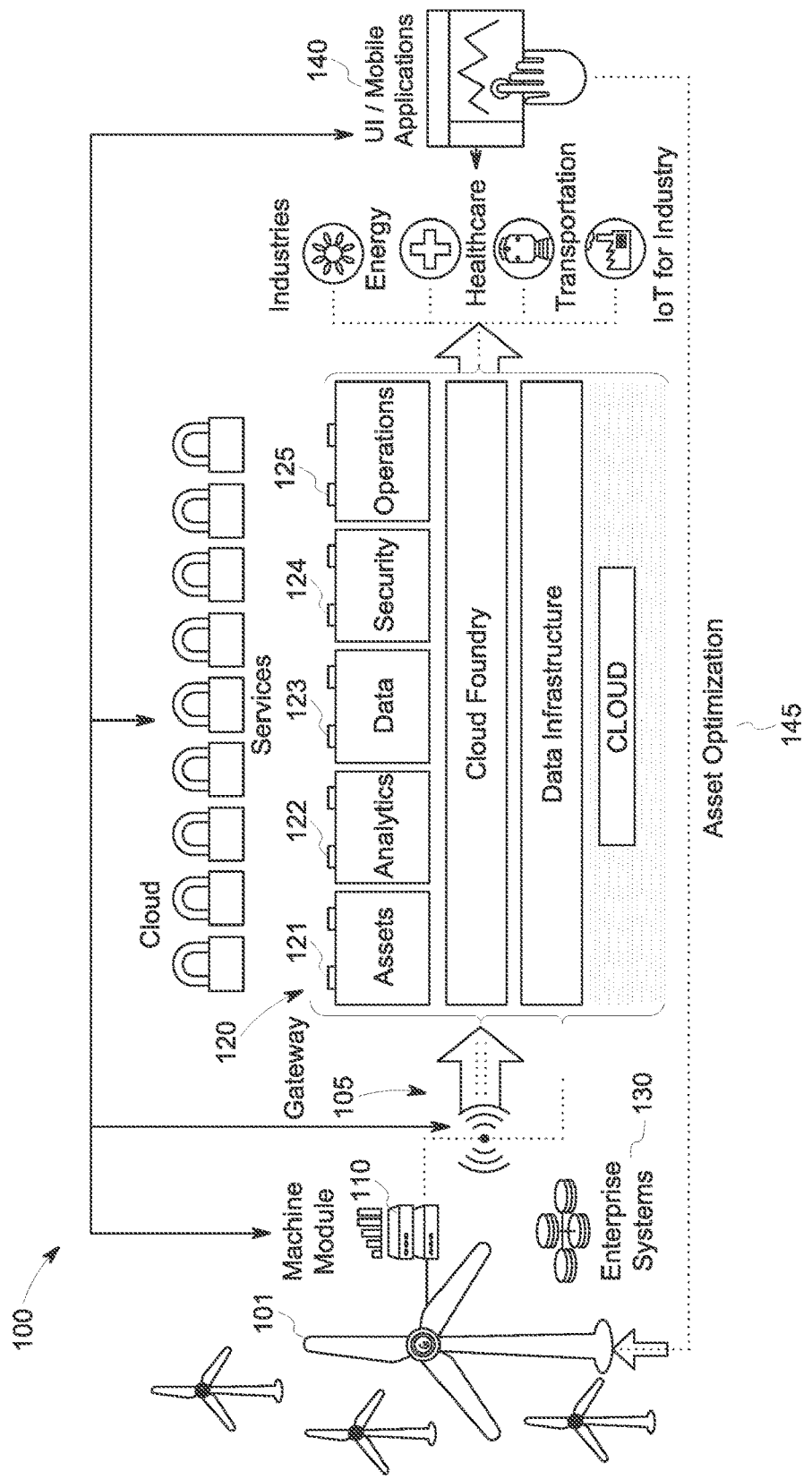
FIG. 1 is a diagram illustrating a cloud computing environment associated with industrial systems in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a software and system for managing and facilitating a software development lifecycle of a software application. Software development lifecycle is a process used by the software industry to design, develop and test high quality software. The software development lifecycle aims to produce a high-quality software that meets or exceeds customer expectations, reaches completion within times and cost estimates. Traditional software development is performed by a designer/developer that typically has a detailed understanding and training using various programming languages. Based on this expertise, the developer is able to develop, test, and deploy the software application. This developer is often a computer professional such as a software engineer.

However, software engineers are not very prevalent in general and especially in industrial and manufacturing organizations. Furthermore, the cost of hiring and employing a software engineer can be significant. The example embodiments provide a software development lifecycle service that can guide and facilitate an entire development lifecycle for a software application even for a user who is not familiar with the deep complexities of programming languages and data models. The service can provide automated features and tools which can enable even a novice user to develop and deploy a software application. The service can provide a user interface that enables a user to easily build a new application based on components previously requested by the user. The service also puts the developed application into a pipeline for production in a live environment such as a cloud platform or on-premises. The pipeline can further include multiple rounds of testing as well as automated deployment of the application.

In some of the examples herein, the software development is performed for an industrial application that might be applied to one or more assets such as machine and equipment for use in healthcare, industry, manufacture, energy, transportation, and the like. However, the examples herein are not limited to industrial software development and may include any type of software application. The primary users of industrial software may include technicians in the field as well as administrative staff and other users who lack software development training. The software development lifecycle service described herein automates and guides a user through the software development lifecycle process and also deploys the software in response to a simple user request without requiring the software to be manually installed within a cloud platform or an on-premises platform. For example, the software development lifecycle service may abstract away the time-consuming tasks associated with deploying a software application by allowing automatically deploying the software with a single click of a button.

While progress with machine and equipment automation has been made over the last several decades, and assets have become "smarter," the intelligence of any individual asset pales in comparison to the intelligence that can be gained when multiple smart devices are connected together, for example, in the cloud. Assets, as described herein, may refer to equipment and machines used in fields such as energy, healthcare, transportation, heavy manufacturing, chemical production, printing and publishing, electronics, textiles, and the like. Aggregating data collected from or about multiple assets can enable users to improve business processes, for example by improving effectiveness of asset maintenance or improving operational performance if appropriate industrial-specific data collection and modeling technology is developed and applied.

For example, an asset can be outfitted with one or more sensors configured to monitor respective operations or conditions associated with the asset. Data from the sensors can be recorded or transmitted to a cloud-based or other remote computing environment. By bringing such data into a cloud-based computing environment, new software applications informed by industrial process, tools and know-how can be constructed, and new analytics specific to an industrial environment can be created. Insights gained through analysis of such data can lead to enhanced asset designs, enhanced software algorithms for operating the same or similar assets, better operating efficiency, and the like. Examples of the methods-based software applications are described herein as analytics. Analytics may be used to analyze, evaluate, and further understand issues related to manufacturing.

The assets and the software described herein can be included within an Industrial Internet of Things (IIoT). In an example, an IIoT connects assets including machines and equipment, such as turbines, jet engines, healthcare machines, locomotives, and the like, to the Internet or cloud, or to each other in some meaningful way such as through one or more networks. The systems and methods described herein can include using a "cloud" or remote or distributed computing resource or service. The cloud can be used to receive, relay, transmit, store, analyze, or otherwise process information for or about one or more assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

However, the integration of assets with the remote computing resources to enable the IIoT often presents technical challenges separate and distinct from the specific industry and from computer networks, generally. A given machine or equipment based asset may need to be configured with novel interfaces and communication protocols to send and receive data to and from distributed computing resources. Given assets may have strict requirements for cost, weight, security, performance, signal interference, and the like such that enabling such an interface is rarely as simple as combining the asset with a general-purpose computing device. To address these problems and other problems resulting from the intersection of certain industrial fields and the IIoT, the cloud platform can receive and host applications from many different fields of industrial technologies. The example embodiments facilitate generation and design of these applications by providing a software development lifecycle service capable of being used to build and deploy new software applications for use in the cloud computing environment.

The Predix™ platform available from GE is a novel embodiment of an Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of assets can be uniquely situated to leverage its understanding of assets themselves, models of such assets, and industrial operations or applications of such assets, to create new value for industrial customers through asset insights.

FIG. 1 illustrates a cloud computing environment associated with industrial systems in accordance with an example embodiment. FIG. 1 illustrates generally an example of portions of an asset management platform (AMP) 100. As further described herein, one or more portions of an AMP can reside in a cloud computing system 120, in a local or sandboxed environment, or can be distributed across multiple locations or devices. The AMP 100 can be configured to perform any one or more of data acquisition, data analysis, or data exchange with local or remote assets, or with other task-specific processing devices. The AMP 100 includes an asset community (e.g., turbines, healthcare machines, oil rigs, mining equipment, chemical processing systems, etc.) that is communicatively coupled with the cloud computing system 120. In an example, a machine module 110 receives information from, or senses information about, at least one asset member of the asset community, and configures the received information for exchange with the cloud computing system 120. In an example, the machine module 110 is coupled to the cloud computing system 120 or to an enterprise computing system 130 via a communication gateway 105.

In an example, the communication gateway 105 includes or uses a wired or wireless communication channel that extends at least from the machine module 110 to the cloud computing system 120. The cloud computing system 120 may include several layers, for example, a data infrastructure layer, an application platform layer, and modules for providing various functions. In the example of FIG. 1, the cloud computing system 120 includes an asset module 121, an analytics module 122, a data acquisition module 123, a data security module 124, and an operations module 125. Each of the modules includes or uses a dedicated circuit, or instructions for operating a general purpose processor circuit, to perform the respective functions. In an example, the modules 121-125 are communicatively coupled in the cloud computing system 120 such that information from one module can be shared with another. In an example, the modules 121-125 are co-located at a designated datacenter or other facility, or the modules 121-125 can be distributed across multiple different locations.

An interface device 140 (e.g., user device, workstation, tablet, laptop, appliance, kiosk, and the like) can be configured for data communication with one or more of the machine module 110, the gateway 105, and the cloud computing system 120. The interface device 140 can be used to monitor or control one or more assets. As another example, the interface device 140 may be used to develop and upload applications to the cloud computing system 120. As yet another example, the interface device 140 may be used to access analytical applications hosted by the cloud computing system 120. In an example, information about the asset community may be presented to an operator at the interface device 140. The information about the asset community may include information from the machine module 110, or the information can include information from the cloud computing system 120. The interface device 140 can include options for optimizing one or more members of the asset community based on analytics performed at the cloud computing system 120. Prior to analytics being accessed through the cloud computing system 120, the cloud computing system 120 may certify the analytics.

As a non-limiting example, a user of the interface device 140 may control an asset through the cloud computing system 120, for example, by selecting a parameter update for a first wind turbine 101. In this example, the parameter update may be pushed to the first wind turbine 101 via one or more of the cloud computing system 120, the gateway 105, and the machine module 110. In some examples, the interface device 140 is in data communication with the enterprise computing system 130 and the interface device 140 provides an operation with enterprise-wide data about the asset community in the context of other business or process data. For example, choices with respect to asset optimization can be presented to an operator in the context of available or forecasted raw material supplies or fuel costs. As another example, choices with respect to asset optimization can be presented to an operator in the context of a process flow to identify how efficiency gains or losses at one asset can impact other assets.

Returning again to the example of FIG. 1, some capabilities of the AMP 100 are illustrated. The example of FIG. 1 includes the asset community with multiple wind turbine assets, including the first wind turbine 101. However, it should be understood that wind turbines are merely used in this example as a non-limiting example of a type of asset that can be a part of, or in data communication with, the first AMP 100. FIG. 1 further includes the device gateway 105 configured to couple the asset community to the cloud computing system 120. The device gateway 105 can further couple the cloud computing system 120 to one or more other assets or asset communities, to the enterprise computing system 130, or to one or more other devices. The AMP 100 thus represents a scalable industrial solution that extends from a physical or virtual asset (e.g., the first wind turbine 101) to a remote cloud computing system 120. The cloud computing system 120 optionally includes a local, system, enterprise, or global computing infrastructure that can be optimized for industrial data workloads, secure data communication, and compliance with regulatory requirements.

The cloud computing system 120 can include the operations module 125. The operations module 125 can include services that developers can use to build or test Industrial Internet applications, and the operations module 125 can include services to implement Industrial Internet applications, such as in coordination with one or more other AMP modules. In an example, the operations module 125 includes a microservices marketplace where developers can publish their services and/or retrieve services from third parties. In addition, the operations module 125 can include a development framework for communicating with various available services or modules. The development framework can offer developers a consistent look and feel and a contextual user experience in web or mobile applications. Developers can add and make accessible their applications (services, data, analytics, etc.) via the cloud computing system 120.

Information from an asset, about the asset, or sensed by an asset itself may be communicated from the asset to the data acquisition module 123 in the cloud computing system 120. In an example, an external sensor can be used to sense information about a function of an asset, or to sense information about an environment condition at or near an asset. The external sensor can be configured for data communication with the device gateway 105 and the data acquisition module 123, and the cloud computing system 120 can be configured to use the sensor information in its analysis of one or more assets, such as using the analytics module 122. Using a result from the analytics module 122, an operational model can optionally be updated, such as for subsequent use in optimizing the first wind turbine 101 or one or more other assets, such as one or more assets in the same or different asset community. For example, information about the first wind turbine 101 can be analyzed at the cloud computing system 120 to inform selection of an operating parameter for a remotely located second wind turbine that belongs to a different asset community.

The cloud computing system 120 may include a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration can be useful when an application requires an underlying hardware configuration. The provisioning management and pooling of resources can be done at a granular level, thus allowing optimal resource allocation. In addition, the asset cloud computing system 120 may be based on Cloud Foundry (CF), an open source PaaS that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The cloud computing system 120 can include a data services module that can facilitate application development. For example, the data services module can enable developers to bring data into the cloud computing system 120 and to make such data available for various applications, such as applications that execute at the cloud, at a machine module, or at an asset or other location. In an example, the data services module can be configured to cleanse, merge, or map data before ultimately storing it in an appropriate data store, for example, at the cloud computing system 120. A special emphasis may be placed on time series data, as it is the data format that most sensors use.

In the example of FIG. 1, the software development lifecycle service described herein may be implemented within the cloud computing system 120. As another example, the software development lifecycle service may be implemented in an application platform that is not part of a cloud platform. Using the software development lifecycle service, a user (e.g., via a cloud-connected device such as interface device 140 or some other user device) can access the lifecycle service and build a new software application. The service can guide the user through the building process and also put the application in a pipeline to deployment. In addition, in response to receiving a simple user input such as a button click or a mouse click, the service can deploy the newly created application within the cloud computing system 120 where it is available and active to other users and subscribers of the cloud computing system 120.

Figure 2:
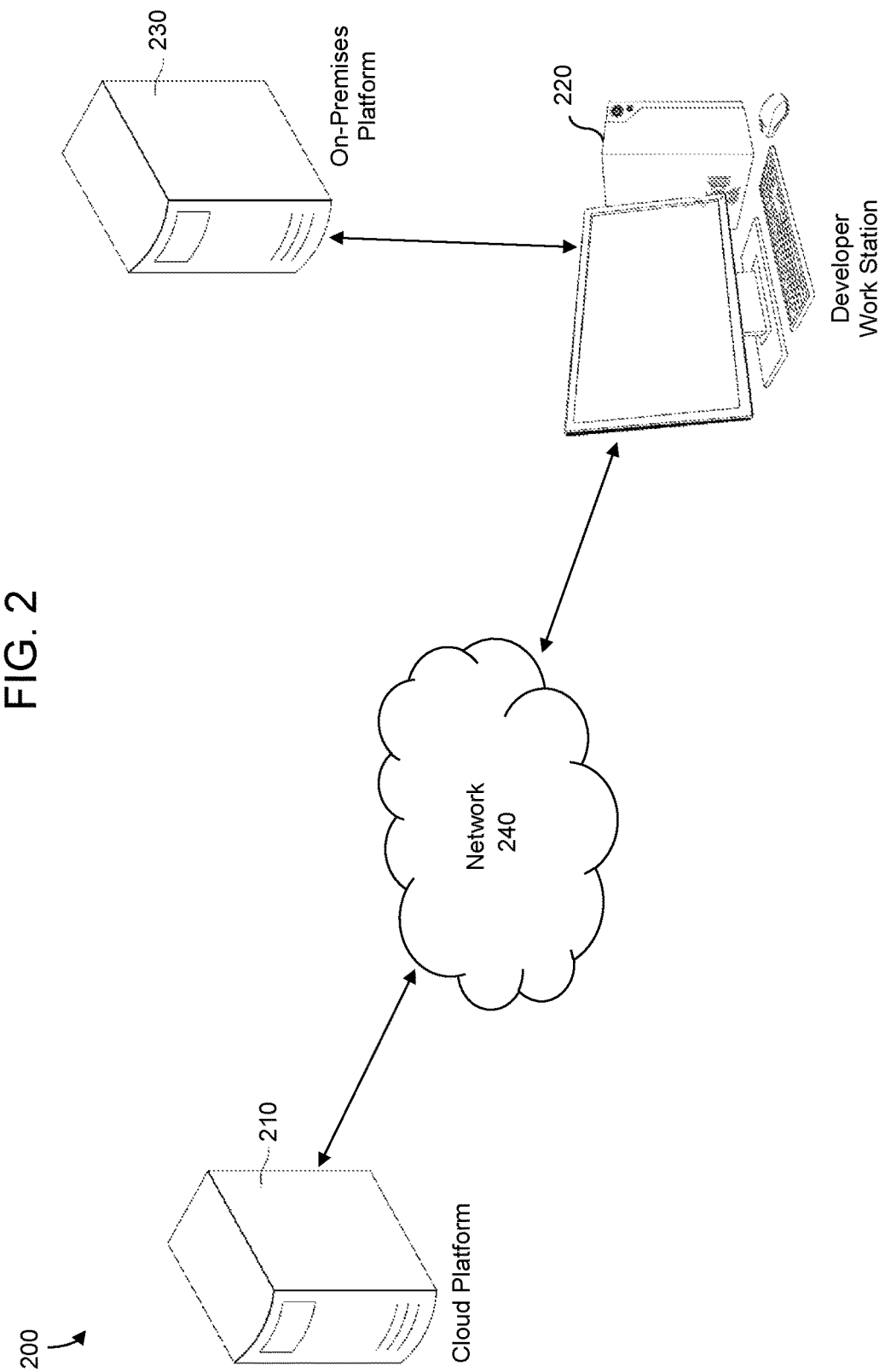
FIG. 2 is a diagram illustrating an industrial application development network in accordance with an example embodiment.

FIG. 2 illustrates an industrial application development network 200 in accordance with an example embodiment. Referring to FIG. 2, the network 200 includes a cloud platform 210, a developer workstation 220, and an on-premises server 230. In this example, the developer workstation 220 may be controlled by a user that is developing a new industrial software application via the software development lifecycle service of the example embodiments. In this example, the developer workstation 220 may be connected to the cloud platform 210 via a network 240 such as the Internet, a private network, and/or the like. The developer workstation 220 may also be connected to an on-premises platform 230 via a local network or through a user manually deploying an application to the on-premises platform 230 from the cloud platform 210. In this example, the user operating developer workstation 220 may be a staff or a technician of an organization that hosts or otherwise uses on-premises platform 230 which may be a local network server. In this example, the user may develop a new software application using the software development lifecycle service described herein. The newly developed software application may be deployed to either of the cloud platform 210 brought to and installed at the on-premises server 230. Furthermore, the developer workstation 220 may perform maintenance and updated on the deployed application.

Figure 3:
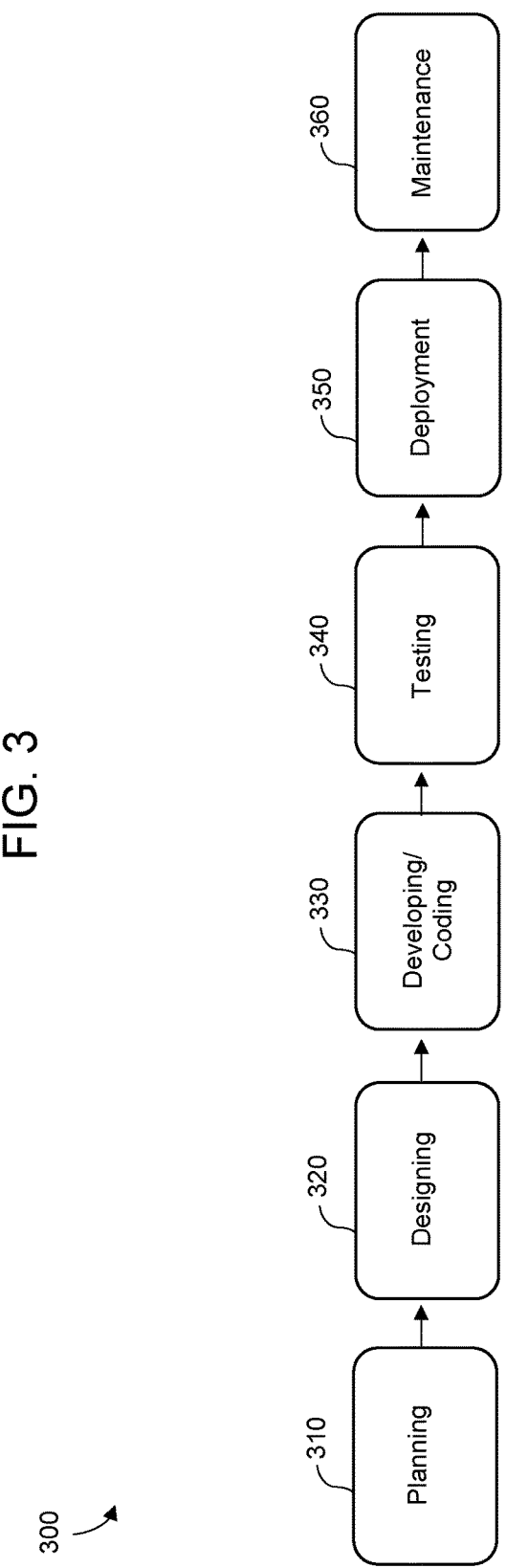
FIG. 3 is a diagram illustrating a software development lifecycle process in accordance with an example embodiment.

FIG. 3 illustrates a software development lifecycle process 300 in accordance with an example embodiment. The process 300 may be performed by the service described herein to build, test, and deploy a new software application. Referring to FIG. 3, in 310 the process includes planning and requirement analysis. For example, the planning 310 may include receiving goals and objectives to be accomplished by the software, identifying quality and other requirements necessary, and planning a basic software approach to satisfy these goals and requirements. In addition, the software product requirements are clearly defined and approved by the client typically through documentation. In 320, the software application is designed. In most cases, there will be multiple approaches for designing the software. The designing in 320 determines the best architecture to be used to develop the product. The design may be reviewed and analyzed and based on various parameters such as risk assessment, product robustness, design modularity, and budget and time constraints, and the best design approach is selected for the product. A design approach clearly defines all the architectural modules of the software along with its communication and data flow representation with the external and third-party modules (if any).

In 330, the software is developed through a coding process. In this stage, the development starts and the product is built. In a conventional process, the user must generate programming code. According to various embodiments, the software development lifecycle as a service can use pre-defined software components which the user has already registered with and which are made available by the software via a user interface. The pre-defined software components may include built-in code that is already adapted for use with the user's data and that is tested and tried to work with a platform such as the cloud or an on-premises environment. The available pre-defined software components may include analytics, applications, services, data storage services, historical programs, and the like, and may be defined based on a data storage model of the user's data.

According to various embodiments, the pre-defined software components may follow coding guidelines defined by their organization and programming tools including compilers, interpreters, debuggers, etc. which are used to generate the code. Different high-level programming languages such as C, C++, Pascal, Java, R, Python, and PHP may be used for coding. As another example, one or more fourth-generation programming languages (4GL) may be supported, and the like. Because the software components are already coded, there is an enormous amount of time and difficulty which the user/developer is relieved of. Furthermore, when the user has developed an initial version of the project they are satisfied with, they may save the version of the product and generate an application or software file (e.g., by pressing a button in the user interface). The application file may be an application definition, an application artifact, an application model, and/or the like, which represents runs on an application platform such as a host server, a web server, a cloud platform, or the like. The application file may be stored in a code repository or other storage associated with the user interface and/or the software development lifecycle service.

In 340, testing is performed on the application file to test the developed software application. Here, the testing may be initiated based on the application file being stored in the code repository. For example, the repository may include a hook that identifies when a new project is stored therein and which triggers execution of one or more software tests based on the identifying. At this stage, in some embodiments, testing of the software product may be performed to identify defects and report the defects. Accordingly, the defects can be tracked, fixed and retested, until the product reaches the quality standards.

In 350, the successfully tested and developed software application is deployed into a live operating environment where it may be consumed by one or more client/users of the product. For example, the software application may be automatically deployed into a cloud environment (e.g., an application platform) such as shown in FIG. 1. For an on-premises environment such as FIG. 2, the application file may be downloaded and installed manually. The deploying may include several interrelated activities with possible transitions between them. These activities can occur at the developer side or at the client side or both. Because every software system is unique, the deployment processes or procedures within each activity may be different. Therefore, "deployment" may be a general process that is customized according to specific requirements or characteristics. Typically, the deployment includes installation of the software application within an operating platform which is also referred to as a production or productive environment. The installation may include establishing some form of command, shortcut, script or service for executing the software (manually or automatically). For complex systems, it may also include configuration of the system which may be performed automatically by the lifecycle service. Activation includes the activity of starting up or otherwise running the application component of software for the first time on the platform.

In 360, maintenance on the deployed software is performed. This step may be continuous or performed on a periodic basis over a continued period of time. Maintenance may include modifications and updates that are performed after the delivery of software application. Reasons for modifications and updates include changes to market conditions (e.g., policies which change over the time such as newly introduced constraints) client requirements (e.g., add new features or functions), host modifications (e.g., hardware, platform, software changes), and organization changes (e.g., changes in company structure, adding a new business, etc.)

Figure 4:
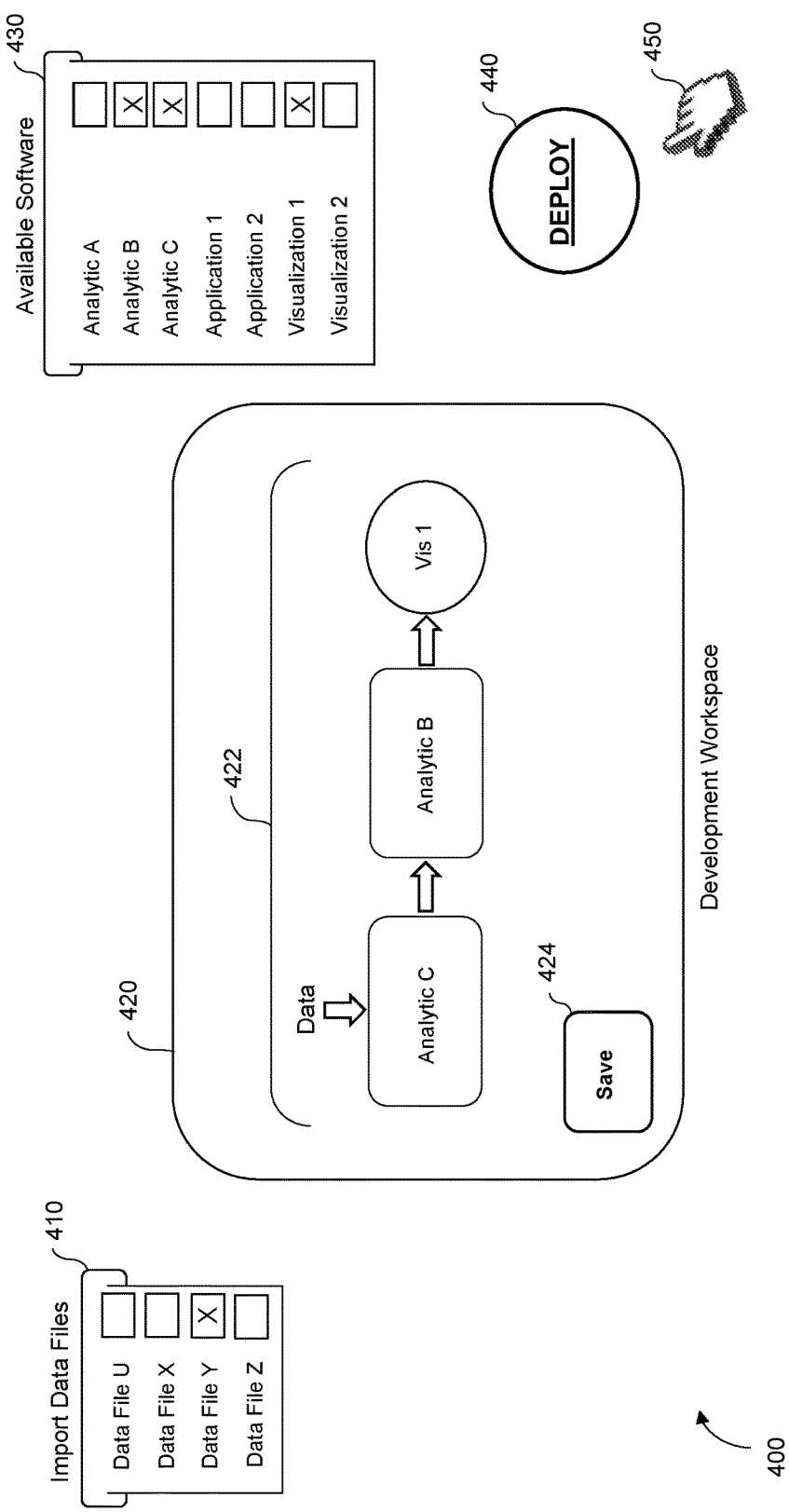
FIG. 4 is a diagram illustrating a user interface for managing a software development lifecycle of an application in accordance with an example embodiment.

FIG. 4 illustrates a user interface 400 for managing a software development lifecycle of an application in accordance with an example embodiment. The user interface 400 may be displayed via a user device and may be generated and controlled by the software development lifecycle service. The user may develop a software application via the user interface 400 based available software components 430 which may be identified and provided to the user by the service via an available software window or other visual means. For example, the service may receive a user identifier during a sign-in process, authentication process, etc. and may identify software components such as analytics, applications, historical time-series data, visual software, and the like. The available software components 430 may be provided automatically to the user when the user interface 400 opens, or they may be searched for by the user via a search bar. For example, a catalog of available services may be automatically provided to the user when they sign-in to the service. In addition, when a user searches for a software component, the component may require configuration information such as authentication information, data formats, a URL of the application, and the like. In some embodiments, the configuration information may be entered by the user or it may be automatically or partially provided by the service.

According to various embodiments, the user may select one or more available software components 430, for example, by dragging-and-dropping the available software components in a development workspace 420 or they may select the available components in another way such as by a check-box, or the like. In this example, the user has added Analytic B, Analytic C, and Visualization 1 to the development workspace 420. Within the development workspace 420, the user may easily arrange software components to generate an end-to-end flow 422 for the software application. When the user has reached a point where they would like to test the end-to-end flow 422, the user may select a save button 424 which may store the developed software flow 422 (e.g., the underlying executable code) as an application file in a code repository or other storage medium. In some cases, the application file may be automatically tested by the code repository to ensure that the software can satisfy requirements of its intended activation platform and any coding guidelines. Additional testing such as quality assurance (QA) testing may be performed on an instance of the application file. In some embodiments, the user may also select a software component from the list of available components 430 to expand the software and the underlying code. Here, the code may be displayed via a window that enables the user to modify the code or data pointers included within the code.

In addition to the available software components 430, the service may also provide the user with an input 410 for uploading their data or importing their data into the service and the underlying system via the user interface 400. By uploading the data, the service may automatically recognize a format of the user's data and notify the user of the data format in a notification window enabling the user to understand the format of their data. The available software components 430 may already be pre-configured to work with the user's data either by the system or by the user that designed the software components. In the example of FIG. 4, the user may begin accessing their industrial data in an efficient manner. For example, where it would normally take a long time to wire up services with data, but the service may provide tools which automate the process and facilitate an understanding of the data to the user.

In some cases, the primary goal for digital and industrial application development is performing functions, analytics, and visualizations on data (e.g., time-series data) received from one or more assets on the edge of the cloud. When a user understands their data, it is much easier to build useful insights and views on top of the data. The user interface 400 may include forums or FAQ sections (not shown) where the user can search for guidance on developing the application. In addition, the user interface 400 facilitates and manages a pipeline that helps the user build a software project and put the software into production as part of a cloud or other environment. The service also provides testing which can be performed automatically on the software without requiring user interaction. For example, testing may automatically occur when the user save the software project.

Furthermore, when the application has been successfully tested, the user or a controller of the user interface 400 can deploy the application into an active environment. In the example of FIG. 4, the user is provided a deploy button 440 for simply requesting the application to be transferred from the development process to a live platform such as a cloud environment or an on-premises environment with a click of a mouse cursor 450. The user can develop the application within the user interface 400 against a time-series test data store. When the application is deployed, the user or the system may change a pointer of the application to point at live data instead of the test data. In this case, the test data may be the same format as the live data (as ensured by the service) where the only thing that needs to be changed within the code is the end point of the pointer.

Prior to the application file being stored in the source code repository, the user may add metadata to the application code and submit the code to source code repository. The repository can run the automated tests, then the application in the repository may be deployed onto another instance of a runtime engine (runtime that runs the app that you defined in the user interface 400). For example, the application may be deployed on a QA instance for additional validation. That same app that is in the repository can be pushed into production by specifying where it should be installed and by the user simply pressing the deploy request. In other words, the application may be seamlessly installed and activated from the repository to an active operating platform.

Figure 5:
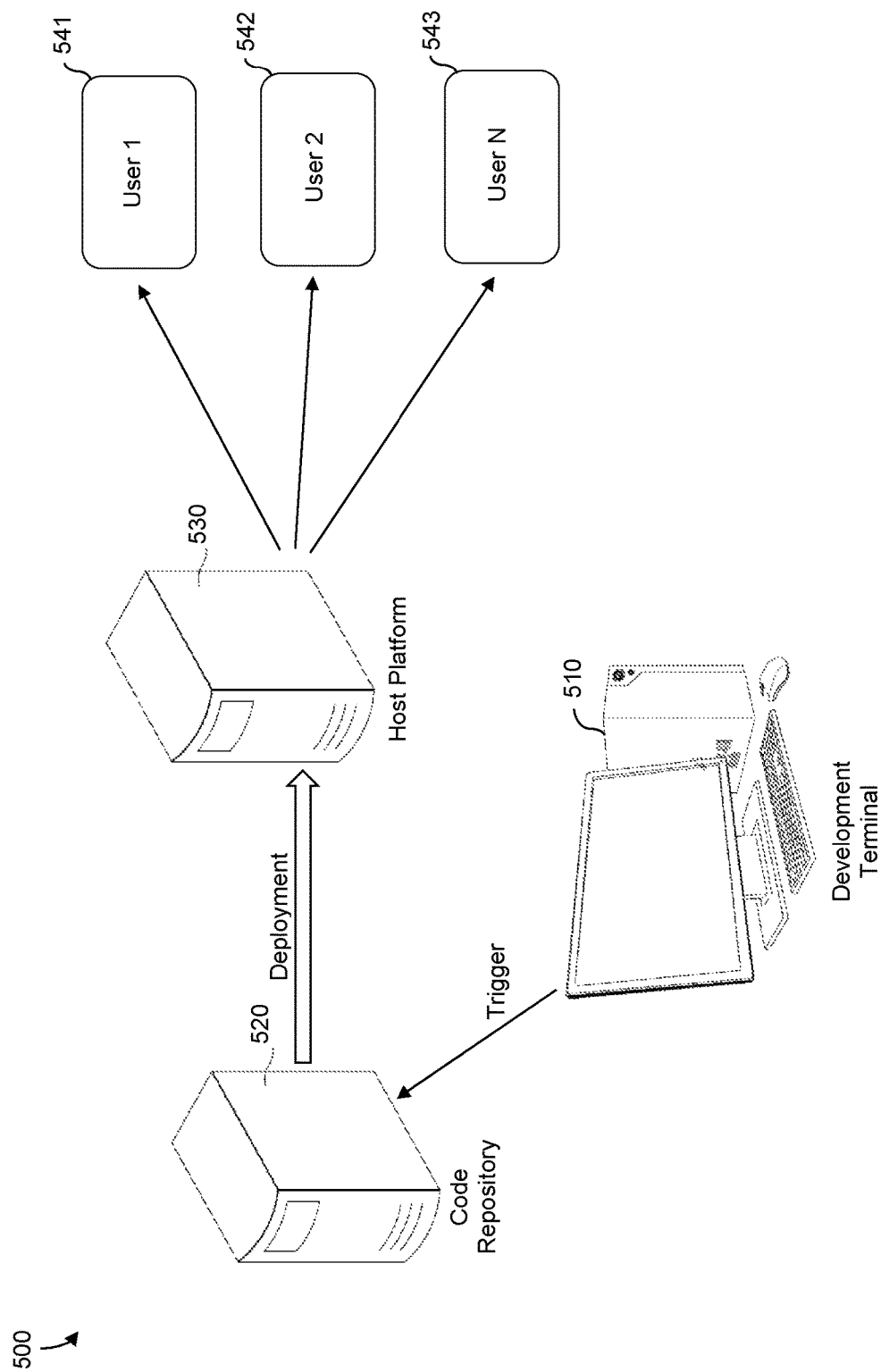
FIG. 5 is a diagram illustrating a system for deploying an industrial application in accordance with an example embodiment.

An example of the deployment process is shown in FIG. 5. In this example, a deployment system 500 is shown and includes a developer terminal 510, a host platform for hosting a deployed application, and a code repository 520 which is shown as a separate device for convenience but may be incorporated into the host platform 530 and/or the development terminal 510. Here, the development terminal 510 may display a user interface (e.g., user interface 400 shown in FIG. 4) that enables a user of the terminal 510 to build and test a software application and store the software application in the code repository 520. Furthermore, based on a triggering event such as a user input, command, script execution, etc., via the development terminal 510 (or via another device not shown such as a platform device), the code repository 520 can transfer the successfully tested application to the host platform 530 where it is deployed without the need for user interaction. In addition to the transferring, the deployment may include an installation of the application on the platform 530, an activation of the application, and the like.

Once activated, the application is then accessible to one or more users 541, 542, and 543 via a connection to the host platform 530. The deployment process is performed behind the scenes such that the user/developer does not need to understand or know how to perform the deployment and all the associated activities and procedures involved with the deployment. As a result, the developer does not need to be physically present at the site of the deployment or be able to access the cloud platform or other platform where the software is deployed. Instead, the developer may provide a URL or other address during the development process via the user interface 400, and the service may take care of the rest.

Figure 6:
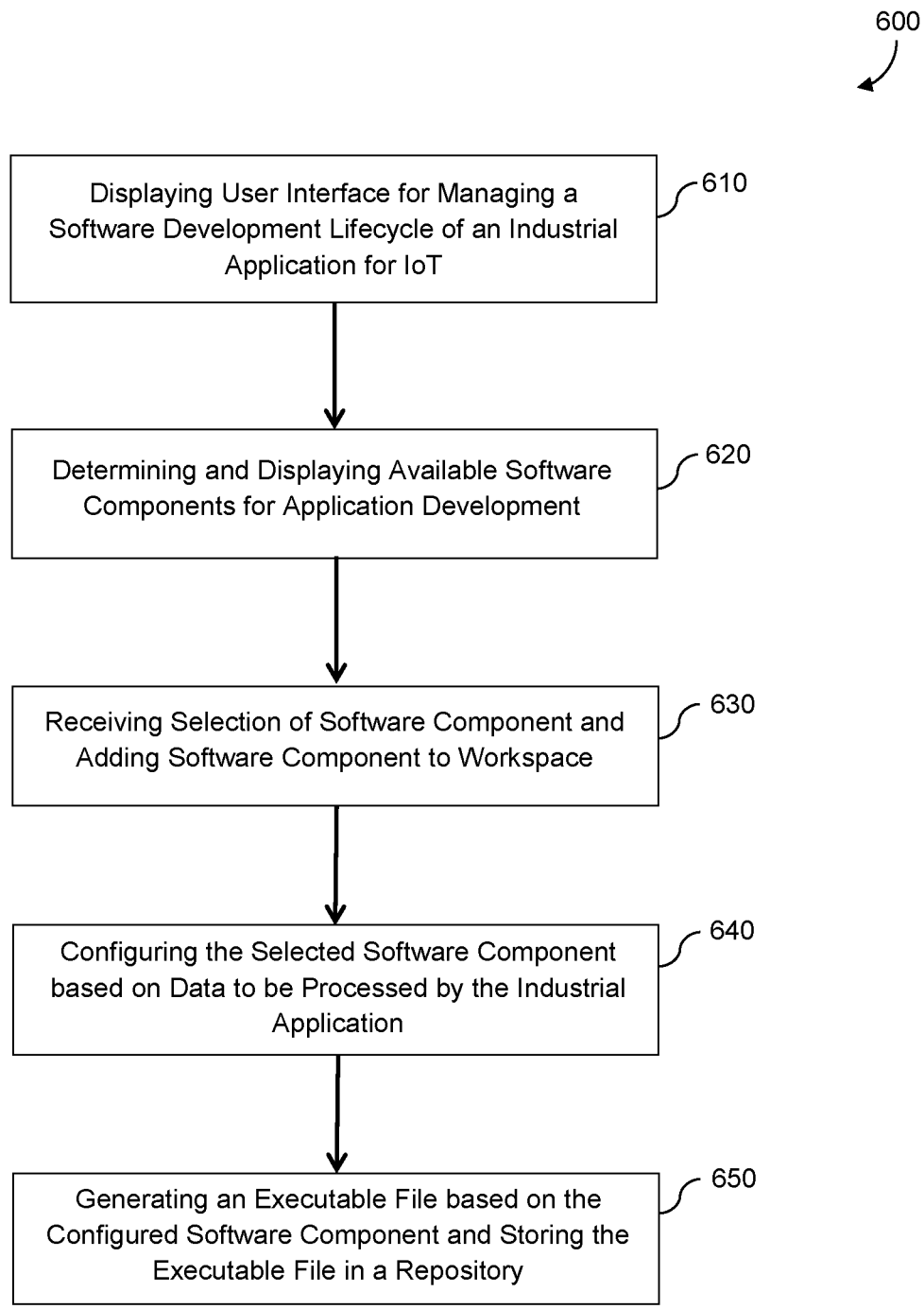
FIG. 6 is a diagram illustrating a method for managing a software development lifecycle of an industrial application in accordance with an example embodiment.

FIG. 6 illustrates a method 600 for managing a software development lifecycle of an industrial application in accordance with an example embodiment. For example, the method 600 may be performed by the software development lifecycle service described herein which may be executed by a user device, a server, a cloud computing environment, and the like. Referring to FIG. 6, in 610, the method includes displaying a user interface for managing a software development lifecycle of an application that is to be deployed. The user interface may be displayed via a user terminal (e.g., software developer, technician, subject matter expert, etc.) and may include tools that facilitate the development of a software application. The user interface may include tools that automate and guide the user through the software development lifecycle process such that the user does not need to be an expert or even familiar with coding to develop a new industrial application but instead may be a novice such as an office staff, an administrator, or a technician in the field who is a subject matter expert on assets such as wind turbines, jet engines, locomotives, gas turbines, mining equipment, aircraft, oil rigs, or the like. The service provided herein is targeted for these users who are unfamiliar with code writing and developing of software.

In 620, the method includes determining software components available for developing the application and displaying representations of the software components via the user interface. For example, the service may identify a user based on a user authentication or login process performed or some other identifier (IP address, email address, etc.) and also perform a look-up of previous software components that the developer or team of developers have previously built or otherwise have access to. For example, the software components may include analytics, visualization programs, data storage programs, or even complete applications. The software components may also be found by the user via the user interface. For example, the user may perform a search for applications that they have previously registered to use. The user interface can provide a panel, box, window, etc., providing a listing of these available software components and enabling the user to select any of the components to add to a new software project or modify an existing software project. In some embodiments, the determining may include determining a catalog of services that have been registered for use by a developer of the software application where the catalog includes one or more of an analytic service, a data storage service, and a visualization service.

In 630, the method includes receiving a selection of at least one software component from among the available software components, via the user interface, and adding the selected at least one software component to a development workspace of the user interface. For example, the user may perform a drag-and-drop operation pulling the representation of the available software component to the workspace. Here, the available software component may include underlying executable code. As a result, the user does not need to generate new code, but may instead rely on previously generated code by other users or the system. By selecting the representation of the available software component into the workspace, the service controlling the user interface may associate the corresponding code of the software component with the current project being developed or edited by the user.

In 640, the method includes configuring the selected at least one software component based on data that is to be processed by the application, and in 650, generating an application file for the application including the at least one configured software component and storing the application file in a storage such as a code repository or other file storage. In these examples, the configuring may be manual, partially automated, or fully automated. For example, the configuring may include receiving one or more configuration inputs manually entered by a user via the user interface. For example, the one or more configuration inputs may include one or more of a uniform resource locator (URL) and authentication information associated with the application. As another example, the configuring may include an automated or partially-automated configuration process in which the selected at least one software component is automatically configured to process time-series data for the industrial application. Although not shown in FIG. 6, the method may further include performing testing such as cloud-based integration testing and/or QA testing on the application file of the application after it has been stored in the code repository. For example, the testing may be automatically performed in response to the application file being stored in the code repository.

Figure 7:
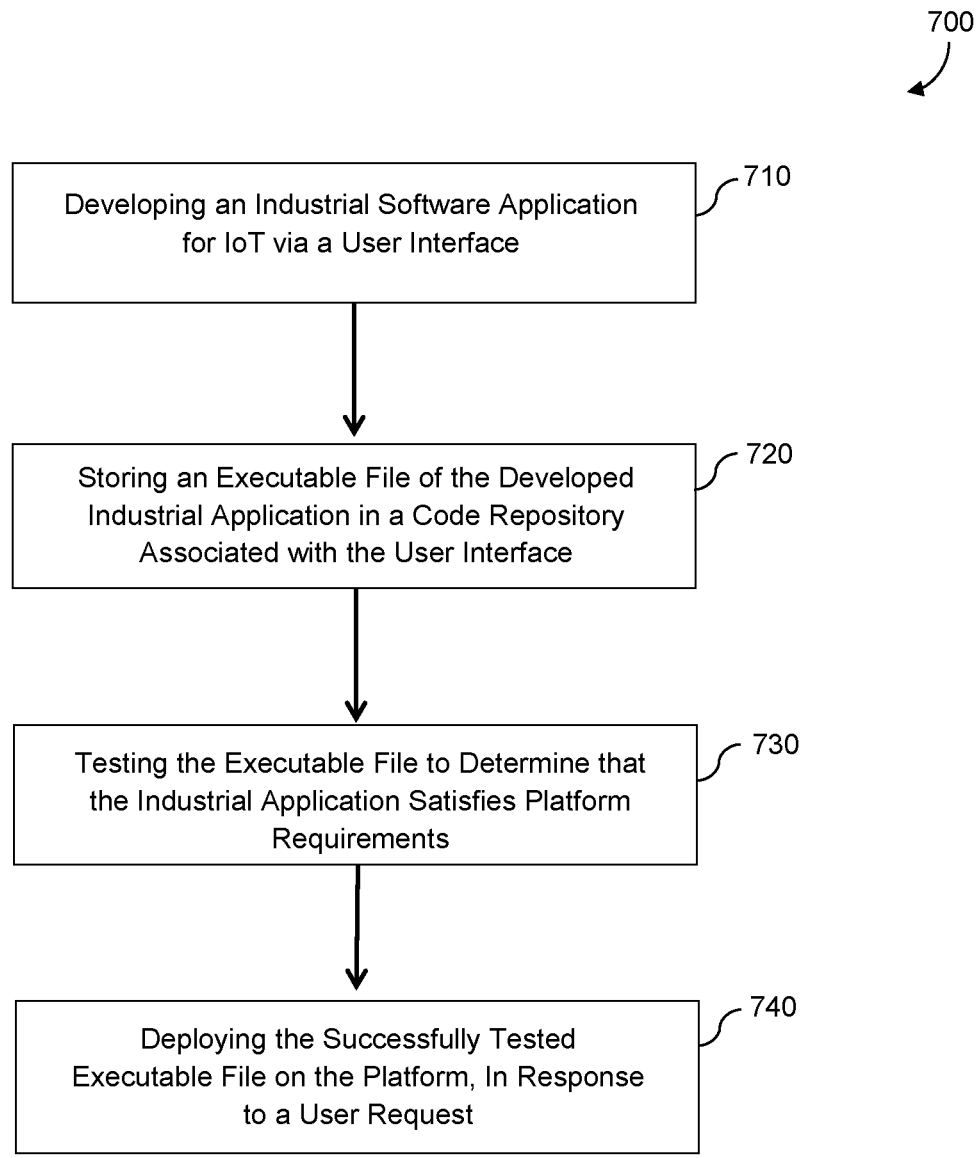
FIG. 7 is a diagram illustrating a method for deploying an industrial application in accordance with an example embodiment.

FIG. 7 illustrates a method 700 for deploying an industrial application in accordance with an example embodiment. For example, the method 700 may be performed by the software development lifecycle service described herein which may be executed by a user device, a server, a cloud computing environment, and the like. Referring to FIG. 7, in 710, the method includes developing an industrial software application via a user interface. For example, the developing process may include the steps described in FIG. 6 in which a software development lifecycle is managed by a user interface. Here, the software may be developed by someone who is not familiar with software writing but instead a technician or other person such as a subject matter expert, a staff member or administrator, and the like.

In 720, the method includes storing an application file representing the developed industrial software application in a code repository associated with the user interface. For example, the application file may be generated by a command received via the user interface and in response, the user interface may generate the application file and store the application file in a code repository that is included in a host device of the user interface software, or that is connected to the host device via a network such as the Internet. In 730, the method further includes testing the application file to determine whether the developed industrial software application successfully satisfies requirements for a platform as well as any other tests that the developer or the company desires. The testing may be automatically performed in response to the code being stored in the code repository. For example, the code repository may include a hook such that each time a new software file is added or updated, the hook executes one or more tests on the newly added or updated software file.

In 740, the method includes deploying the successfully tested application file from the code repository to the platform for active use, in response to receiving a user request. For example, the deploying may include deploying the successfully tested application file from the code repository to a cloud platform or an on-premises platform in response to receiving a single input (e.g., mouse-click, speech command, key press, hand motion, etc.) from a user. In some embodiments, the single input may include a single input received from a developer of the application via the user interface. As another example, the single input may include a single input received from an administrator of the platform that controls the deployment process of new applications. As an example, the deploying may include transferring the application file from the code repository or other storage to the platform, installing the application file on the platform, and activating the application file on the platform. Prior to or during the deploying, the method may further include modifying a data pointer of code in the application file from pointing at test data to point at live data. In other words, the administrator or the developer may easily change the target of the application file from the test data to the real live data.

By automatically deploying the industrial application to the platform with a single input such as a mouse-click, the example embodiments essentially abstract away the lengthy and time-consuming process of deploying applications as performed traditionally. That is, the one-click deployment does not require a user to manually perform a number of functions and operations such as installation and configuration of the application on-premises or in a cloud environment. Rather, all the user needs to do is make a single selection and the deployment process is performed behind the scenes.

Figure 8:
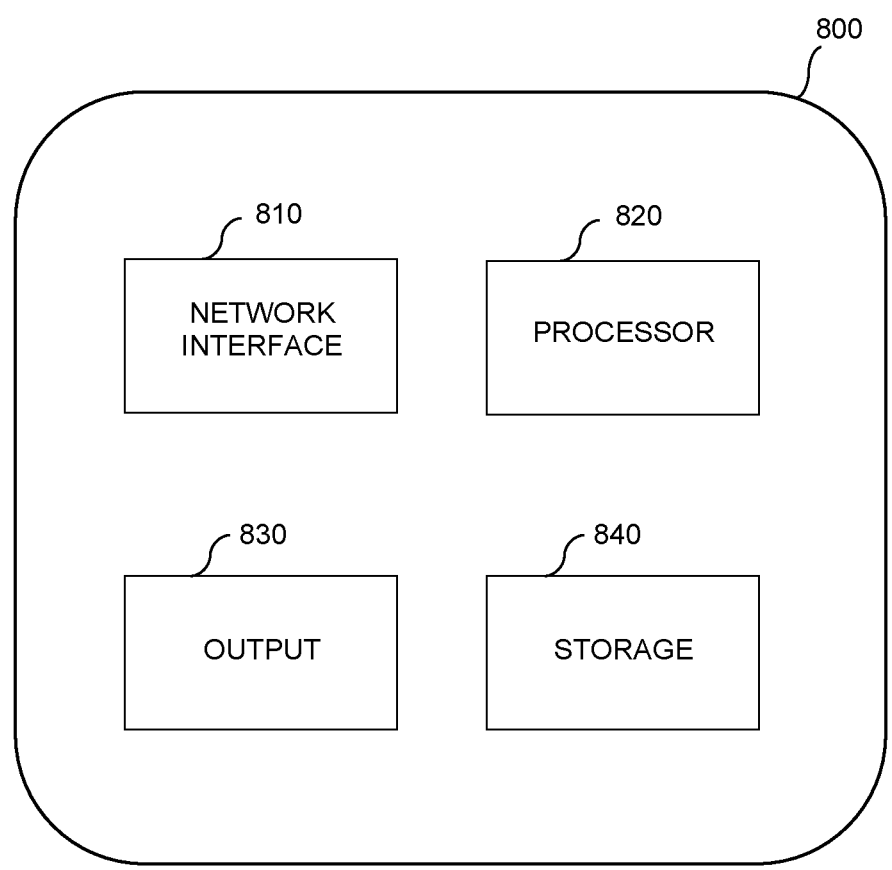
FIG. 8 is a diagram illustrating a computing system for developing and deploying an industrial application in accordance with an example embodiment.

FIG. 8 is a diagram illustrating a computing system for developing and deploying an industrial application in accordance with an example embodiment. For example, the computing system 800 may be implemented within a cloud computing environment, a server, a user device, and the like. Referring to FIG. 8, the computing system 800 includes a network interface 810, a processor 820, an output 830, and a storage device 840. Although not shown in FIG. 8, the computing system 800 may include other components such as a display, an input unit, a receiver/transmitter, and the like. The network interface 810 may transmit and receive data over a network such as the Internet, a private network, a public network, and the like. The network interface 810 may be a wireless interface, a wired interface, or a combination thereof. The processor 820 may include one or more processing devices each including one or more processing cores. In some examples, the processor 820 is a multicore processor or a plurality of multicore processors. Also, the processor 820 may be fixed or it may be reconfigurable. The output 830 may output data to an embedded display of the computing system 800, an externally connected display, a cloud, another device, and the like. The storage device 840 is not limited to any particular storage device and may include any known memory device such as RAM, ROM, hard disk, and the like.

According to various embodiments, the output 830 may output a user interface for managing a software development lifecycle of an application. The user interface may be output to an embedded display of the computer system 800, an externally connected display, a display attached to another device that is connected to the computing system 800 via a network, and the like. The user interface may facilitate and control the software development lifecycle for a new software application and also enable the user to update or modify an existing software project. In response to the user interface being launched, the processor 820 may determine software components available for developing the application and displaying representations of the software components via the user interface. For example, the software components may include analytics, data storage models, previously designed applications and parts thereof, visual representations, and the like.

The processor 820 may detect a selection of at least one software component from among the available software components via the user interface, and add the selected at least one software component to a development workspace included within the user interface. For example, the processor 820 may detect a selection (e.g., drag-and-drop operation, check-mark, etc.) generated by the user via the user interface, and select the software component based thereon. Also, the selected software component may be configured based on data that is to be processed by the application. For example, the configuration may include a data format model of the application, a URL location of the application and/or data, authentication information, and the like. As another example, the configuration may be performed automatically or partially-automated by the software development lifecycle service. The processor 820 may also generate an application file for the application including the at least one configured software component and store the application file in a code repository. In some embodiments, the processor 820 may also perform testing on the application file to determine whether the application file can be successfully integrated into an execution environment such as a cloud platform or an on-premises platform.

According to various other embodiments, the computing system 800 may also perform a one-input or single input deployment of the application file. Here, the processor 820 may detect commands for developing a software application via the user interface, store an application file representing the developed software application in a code repository associated with the user interface, and test the application file to determine whether the developed software application successfully satisfies requirements for a platform. In this embodiment, the processor is further configured to deploy the successfully tested application file from the code repository to an application and active platform for active use, in response to detecting a user request. As an example, the user request may include a user input such as a single input received from a user via the user interface or a single input received from an administrator via an administrator window of the platform.

During the deployment of the application file, the processor 820 may transfer the application file to the execution platform, install the application file on the platform, and activate the application file on the platform, all without user interaction. In other words, the deployment may be performed behind the scenes such that the user is not required to manually perform the deployment operations. In some embodiments, the processor 820 is further configured to modify a data pointer of code in the application file from pointing at test data to point at live data, prior to or during the deploying of the application file As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computer-implemented method executable by a hardware processor, the method comprising:

developing a software application via a development user interface included in a development environment;

storing an application file representing the developed software application in a code repository associated with the development user interface and included in the development environment;

testing the application file to determine that the developed software application successfully satisfies requirements for a production environment; and in response to receiving a single user input from the development user interface;

deploying the successfully tested application file from the code repository in the development environment to the production environment, the deploying comprising transferring the successfully tested application file to a live platform in the production environment, installing the successfully tested application file on the live platform without user interaction, and starting-up the successfully tested application file on the live platform without user interaction such that the software application is capable of live interaction by one or more client users of the software application, activating the application file on the live platform, and automatically modifying a pointer in the application file which points at test data in the development environment to point at live data in the production environment, in response to the single user input.

2. The computer-implemented method of claim 1, wherein the single user input comprises a single input received from a developer via the development user interface.

3. The computer-implemented method of claim 1, wherein the single user input comprises a single input received from an administrator of the platform.

4. The computer-implemented method of claim 1, wherein the deploying comprises deploying the successfully tested application file from the code repository to an on-premises platform and activating the software application for active use by on-premises devices.

5. The computer-implemented method of claim 1, wherein the deploying comprises deploying the successfully tested application file from the code repository to a cloud platform and activating the software application for active use by remote-connected devices.

6. A computing system comprising:

a hardware processor configured to:

detect commands for developing a software application via a development user interface included in a development environment, store an application file representing the developed software application in a code repository associated with the development user interface and included in the development environment, and test the application file to determine that the developed software application successfully satisfies requirements for a production environment; and wherein, in response to receiving a single user input from the development user interface, the hardware processor is further configured to:

deploy the successfully tested application file from the code repository in the development environment to the production environment, the deploying comprising transferring the successfully tested application file to a live platform in the production environment, installing the successfully tested application file on the live platform without user interaction, starting-up the successfully tested application file on the live platform without user interaction such that the software application is capable of live interaction by one or more client users of the software application, activating the application file on the live platform, and automatically modifying a pointer in the application file which points at test data in the development environment to point at live data in the production environment, in response to the single user input.

7. The computing system of claim 6, wherein the single user input comprises a single input received from a user via the development user interface.

8. The computing system of claim 6, wherein the single user input comprises a single input received from a user via an administrator window of the platform.

9. The computing system of claim 6, wherein the processor is configured to deploy the successfully tested application file from the code repository to an on-premises platform and activate the software application for active use by on-premises devices.

10. The computing system of claim 6, wherein the processor is configured to deploy the successfully tested application file from the code repository to a cloud platform and activate the software application for active use by remote-connected devices.

11. A non-transitory computer readable medium having stored therein instructions that when executed by a hardware processor cause the hardware processor of a computer to perform a method comprising:

developing a software application via a development user interface associated with a development environment;

storing an application file representing the developed software application in a code repository associated with the development user interface and included in the development environment;

testing the application file to determine that the developed software application successfully satisfies requirements for a production environment; and in response to receiving a single user input from the development user interface;

deploying the successfully tested application file from the code repository in the development environment to the production environment, the deploying comprising transferring the successfully tested application file to a live platform in the production environment, installing the successfully tested application file on the live platform without user interaction, starting-up the successfully tested application file on the live platform without user interaction such that the software application is capable of live interaction by one or more client users of the software application, activating the application file on the live platform, and automatically modifying a pointer in the application file which points at test data in the development environment to point at live data in the production environment, in response to the single user input.

* * * * *